(No Model.) 2 Sheets—Sheet 1.

O. OHLSSON.
CENTRIFUGAL BUTTER EXTRACTOR.

No. 508,744. Patented Nov. 14, 1893.

Witnesses
Oscar A. Michel
H. N. Allen

Inventor
Olof Ohlsson,
By Drake & Co. Atty's.

(No Model.) 2 Sheets—Sheet 2.

O. OHLSSON.
CENTRIFUGAL BUTTER EXTRACTOR.

No. 508,744. Patented Nov. 14, 1893.

Witnesses
Oscar A. Michel
A. A. Allen

Inventor
Olof Ohlsson,
By Drake & Co., Atty's

UNITED STATES PATENT OFFICE.

OLOF OHLSSON, OF NEWARK, NEW JERSEY.

CENTRIFUGAL BUTTER-EXTRACTOR.

SPECIFICATION forming part of Letters Patent No. 508,744, dated November 14, 1893.

Application filed June 13, 1892. Serial No. 436,473. (No model.)

*To all whom it may concern:*

Be it known that I, OLOF OHLSSON, a citizen of Sweden, residing at Newark, in the county of Essex and State of New Jersey, have invented certain new and useful Improvements in Butter-Making Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to enable either sweet or sour butter to be made by one machine, to enable the machine to be adjusted so as to separate the cream from the milk and then direct it to an outside receptacle to allow it to sour, or, to separate the cream from the milk and then immediately, and by a continuous process, separate the butter from the sweet cream, to make sweet butter, and to enable sweet cream to be separated from the milk while in other parts of the machine butter is being manufactured from sour cream. As a cream separator my improvements largely increase the capacity of the machine; and finally, the improvements secure other advantages and results some of which will be referred to in connection with the descriptions of the working parts.

The invention consists in the improved centrifugal butter extractor and in the arrangements and combinations of parts all substantially as will be hereinafter set forth and embodied in the clauses of the claim.

Figure 1:
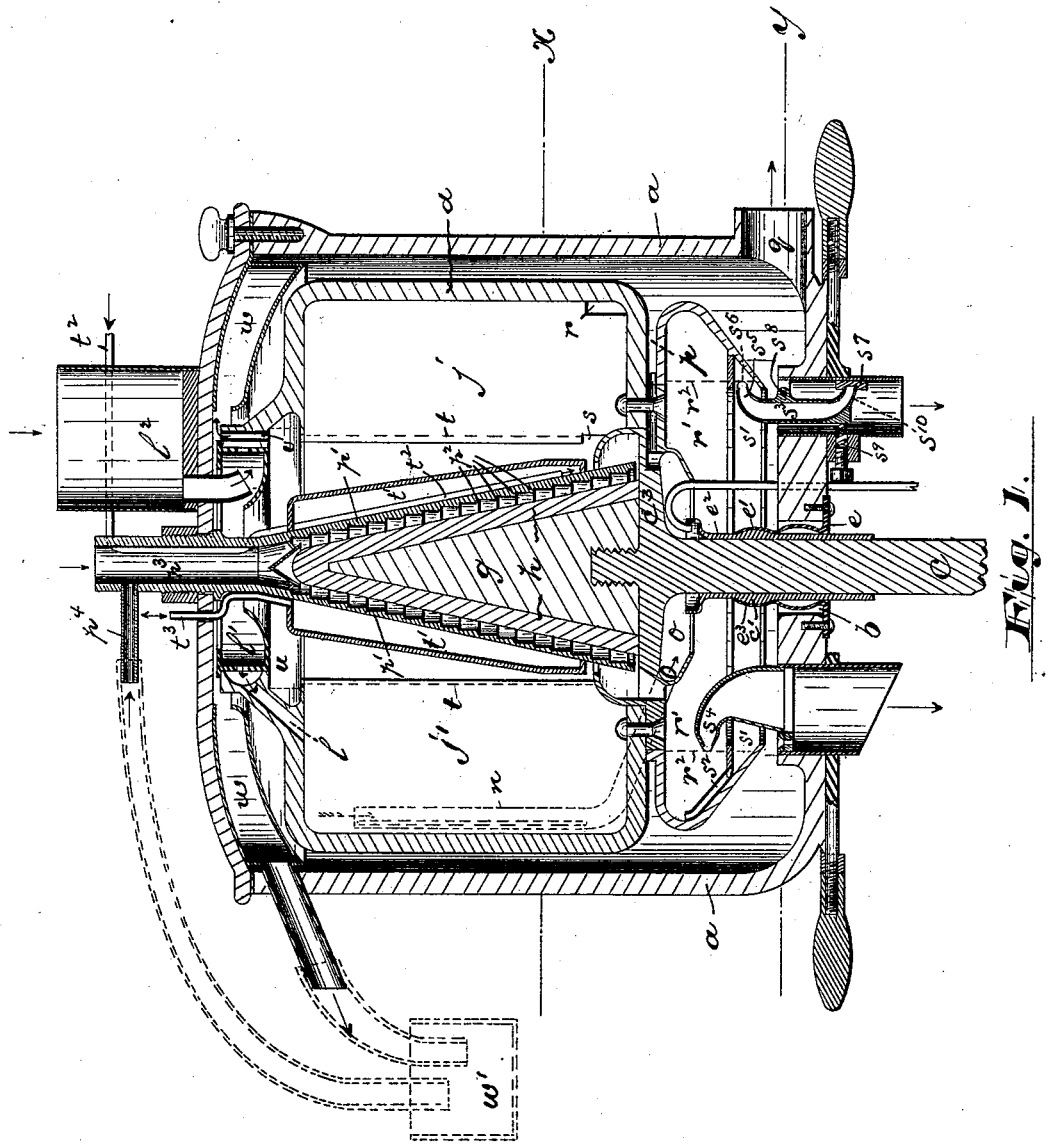
Figure 2:
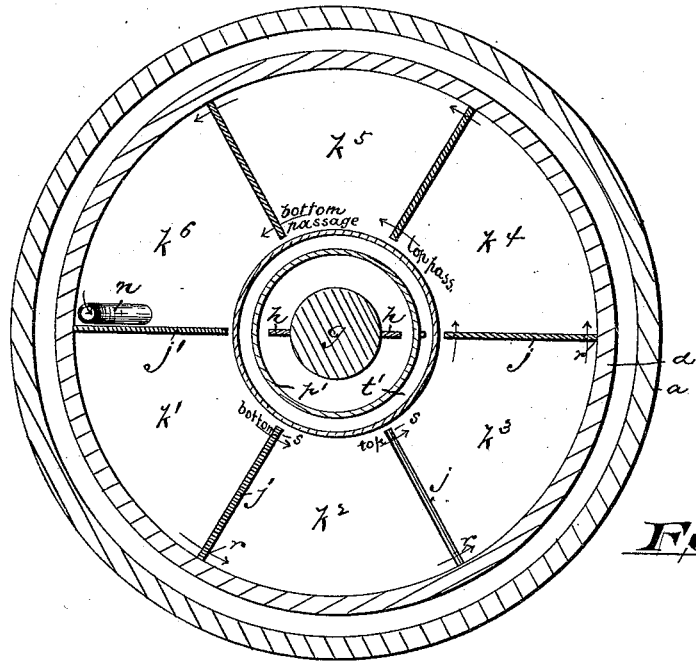
Figure 3:
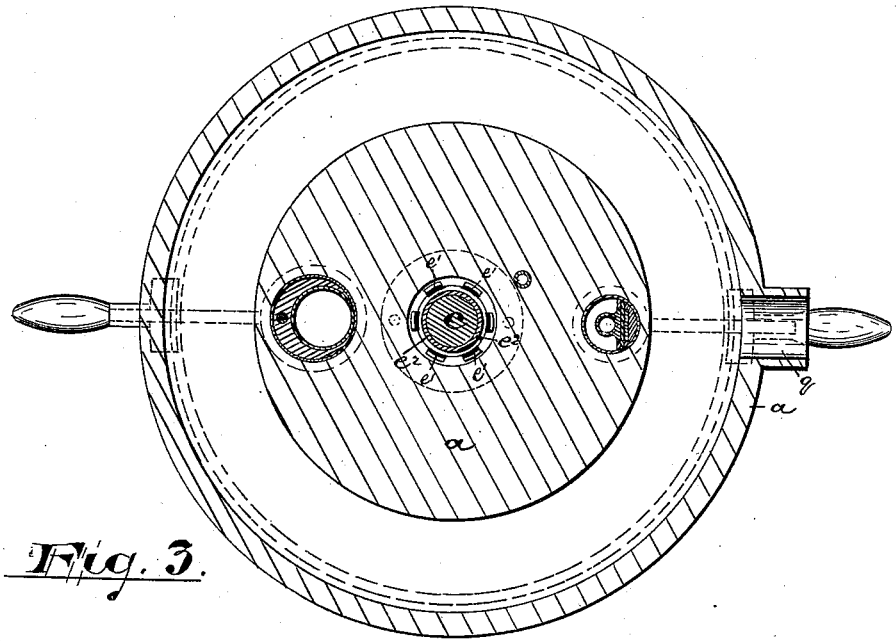

Referring to the accompanying drawings, in which like letters indicate corresponding parts in each of the views, Figure 1 is a central vertical section of portions of the improved machine. Fig. 2 is a section of the same taken on line $x$ and Fig. 3 is a section taken on line $y$.

In said drawings, $a$ indicates an ordinary fixed tank of cast iron or other suitable material, providing, at the bottom, a central perforation or passage, $b$, for a vertically extending shaft $c$, on which the rotary devices are seated, the said shaft being actuated by pulleys or other devices, not shown, in any suitable manner. In said perforation or passage are arranged or formed suitable bearings for said shaft. The bearing preferred consists of a tubular spring clamp $e$ fastened to the bottom of the tank and provided with a vertically extending part having longitudinal slits therein forming arms, $e'$, which grasp the tubular bearing piece, $e^2$, for the shaft, $c$, which said piece allows a limited vibration of the said shaft in the perforation without jarring or hammering. The said spring grasping or clamping arms are interiorly socketed, as at $e^3$, to receive a ball bearing portion, $c'$, of the tubular shaft-bearing, $e^2$, which provides for the lateral vibrations and prevents binding. The shaft carries upon its flange, $c^3$, the central cone, $g$, which has wings, $h$, on its inclined periphery to serve in connection with other cold air draft devices, as will be hereinafter more particularly specified, and a bowl, $d$, surrounding said cone and adapted to receive the milk or cream. The said bowl has inwardly extending wings, $j, j'$, which are radially disposed, as shown in Fig. 2, to separate the outer portions of the interior of said bowl into chambers or compartments through which the fluid to be separated is compelled to take a long course before passing from the bowl. The chambers are marked, in the drawings $k', k^2, k^3, k^4, k^5, k^6$, in the order in which the milk flows through them, the milk first entering the chamber $k'$, through the passage $l$ communicating with the upper reception chamber, $l'$, into which the milk passes from a stationary receptacle, $l^2$, in any suitable manner. From the chamber, $k'$, the milk flows through into the chamber $k^2$, thence into chamber $k^3$, and so on until the circuit of the bowl is completed, when the milk devoid of cream passes out from the chamber, $k^6$, or the last one of the series, through the tube, $n$, to a chamber, $o$, beneath the flange of the shaft $c$, and from thence through the passage, $p$, into the tank, and finally from said tank through the passage, $g$, to any suitable receptable or waste pipe.

To increase the distance traveled by the milk while having its cream extracted by centrifugal force before passing from the bowl, I prefer to form skim milk passages, $r$, in the partitions or wings, $j$, alternately at the top and then at the bottom, so as to cause the milk to take a transverse or oblique course through the chambers and thus cause a more uniform outflow. The tube, $n$, is longitudinally slotted where it lies in the chamber, $k^6$, as will be understood upon reference to Figs. 1 and 2, so as to allow the uniform and free escape of skim milk from both the upper and lower parts of the chamber. The partitions, $j$, at their inner edges, are also provided with cream passages, $s$, which allow the cream to flow diagonally from one chamber to the next successively, the said cream passages extending outwardly into or through the cream wall, $t$, as will be understood upon reference to Fig. 1 and lying alternately at the upper and lower parts of the separating chamber as indicated in Fig. 2. By means of the diagonal course given to the cream, the distance of flow is increased and greater opportunity for separation of skim or "blue" milk therefrom afforded. The capacity of the machine is thus materially increased. From the chambers $k'$, $k^2$, &c., the cream passes upwardly into a chamber, $u$, and from thence through a passage, $v$, into another chamber, $w$, from whence it flows by gravity out from the machine to a tank, $w'$, from which it may be immediately returned to the machine automatically or it may be allowed to remain until sour and then returned to the machine to make sour butter.

In making butter from the sweet cream, I may employ suction or pneumatic force to draw the cream from the tank, $w$, to avoid the expense of labor, although I may allow both the sweet and the sour cream to gravitate into the butter separating devices, the tank in that event being raised above the centrifugal machine.

To separate the butter from the sweet or the sour cream, I subject the same to a rapid cooling process to solidify the butter globules and then pass the butter and butter milk cooled as described, into a centrifugal chamber where the butter globules, because of their lightness are separated from the heavier buttermilk. To this end, I employ the winged cone $g$, and a hood $p'$, resembling an inverted funnel, the inner surface of which is provided with steps $p^2$ over which the cream flows in its downward course in a thin film, while the cold air is forced into contact therewith. The rotary cone provided with wings, $h$, and revolving at a very high rate of speed, draws the cold air from a suitable refrigerator stationed conveniently at hand, through the tube or passage $p^3$ into the flaring chamber between the hood $p$, and the cone, where it is forced into contact with the cream, which, by gravity or suction, has entered through the tube or passage $p^4$. After passing downward as described both the air and cream enter the butter separating chamber, $r'$, where the cream is given rapid rotary movement and the butter globules hardened by the cold air separate from the butter milk and form a butter wall $r^2$ toward the center of the machine while the butter milk, because of its greater gravity collects at the outer parts of the chamber and is led to a lower chamber, $s'$, through a pipe $s^2$ where it is caught by a self adjusting knife, $s^3$, and led to a point of final escape. The butter standing on the butter wall is cut therefrom by a knife $s^4$. The self adjusting knife or outlet tube, $s^3$, serves to automatically regulate the proportion of butter and buttermilk which shall be removed by the butter knife, $s^4$. This consists of a U-shaped tube. The bent end $s^5$ serves as a knife to receive the buttermilk from the buttermilk wall, $s^6$, while the opposite end, which is bent to engage a bearing $s^7$ is more or less perfectly closed to prevent the passage of the buttermilk. At a point between the two ends of the knife, the same is pivoted as at $s^8$, and a spring $s^9$ serves to hold the outlet end more firmly against its bearing or stopper. As the buttermilk is cut or forced into the automatically adjustable tube or knife it is forced to escape through the opposite end of the tube and this pressure causes the end $s^{10}$ to move away from its stopper, against the power of the spring to provide the proper egress opening. By this contrivance I can regulate and control the working of the butter and the escape of butter milk and can govern the proportion of butter milk which will remain in the butter as it passes from the machine.

Around the funnel or hood of the cooling apparatus I prefer to form a water chamber, $t'$, to prevent the heat of the cream and milk from passing through the hood and counteracting the cooling operation. This chamber, $t'$, is supplied with cold water through the pipe or duct $t^2$ and the warmer water escapes through the pipe $t^3$.

Having thus described the invention, what I claim as new is—

1. In a centrifugal machine substantially as herein described, the combination with a tank $a$, rotary bowl, $d$, having wings, $j$, separating the outer part of said bowl into chambers, the said wings having cream passages at or toward their inner edges and at or toward the upper and lower parts alternately whereby the cream is given diagonal courses through the said chambers.

2. In a centrifugal butter making machine, the combination with the rotary bowl of wings, $j$, having passages at their inner parts for the cream and having said passages at their upper and lower parts alternately to secure a diagonal course to said cream, and a pipe or passage extending vertically in one of the chambers between said wings and provided with a vertical passage or passages to admit of the outflow of skim milk from both upper and lower parts of said chamber simultaneously substantially as set forth.

3. In a centrifugal butter making machine, the combination with the rotary bowl, of wings extending inwardly from the walls of said bowl, one of said wings closing completely against the wall of the bowl and extending through the cream wall its entire length and being without cream or skim milk passages to prevent the flow of cream or milk from one of the adjacent chambers to the other and the others of said wings being provided with such passages arranged alternately at the upper and lower parts and at both the inner and outer edges or parts of said wings, and passages to admit of the outflow of the cream and skim milk after separation, substantially as set forth.

4. In a centrifugal butter making machine, the cream separating chamber having a wing or partition closing completely against the inner wall of the bowl so as to be without passages admitting of a flow from one side of said partition to the other and extending inwardly through the normal cream wall formed when the machine is in practical operation, the extension through the cream wall being over its entire length so that the cream will be prevented from flowing from one side to the other of said wing or partition, and other wings having cream passages arranged or formed in the inner edges and alternately at the top and bottom parts thereof, an inlet passage for milk at one side of said wing without passages and outflow passages for cream and skim milk on the opposite side of said wing, substantially as set forth.

5. The improved butter making machine in which is combined a cooling passage for the cream and a stepped surface in said passage to retard the flow of cream therethrough, substantially as set forth.

6. In a butter making machine, the combination with the cone having wings, and means for operating the same of a stepped hood, arranged around said cone and forming an air and milk passage between substantially as set forth.

7. In a butter making machine, the combination with the rotary wings and means for operating the same, of a hood arranged around said wings and forming a chamber therewith, said hood having, on the side toward said wings, an irregular surface or one with impeding means thereon, to prevent or reduce rapidity in the flow of cream, whereby the cream may be more perfectly cooled in passing, substantially as set forth.

8. In a butter making machine, the combination with the tank and rotary bowl having wings on the outer part, of a central cone having a stepped hood, means for forcing cold air between the cone and hood, and means for subjecting the cooled cream to rapid rotary motion, substantially as set forth.

9. In combination with the rotary bowl, of a self adjusting knife arranged adjacent to the fluid wall and movable at its cutting edge to and fro in the direction of said wall to receive the fluid from said wall and regulate the amount of outflow therefrom substantially as set forth.

10. In combination with the rotary separator, a tubular knife arranged to cut the cream from the cream wall within said separator and having bent ends one of which receives the cream from the cream wall and the other delivers the same against a bearing, and said bearing receiving said cream from the tubular knife and rendering the same automatically adjustable substantially as set forth.

11. In combination with the rotary bowl having the butter separating chamber and butter milk chamber communicating therewith, the latter being adapted to form a wall of butter milk, a knife $s^3$, pivoted at $s^8$ and engaging the butter milk wall as at $s^5$, a bearing $s^7$ and a spring $s^9$ all arranged and combined substantially as set forth.

In testimony that I claim the foregoing I have hereunto set my hand this 27th day of May, 1892.

OLOF OHLSSON.

Witnesses:
CHARLES H. PELL,
OSCAR A. MICHEL.